United States Patent [19]

Hosoya

[11] 4,172,262
[45] Oct. 23, 1979

[54] LINE SAMPLING CIRCUIT FOR TELEVISION RECEIVER

[75] Inventor: Nobukazo Hosoya, Moriguchi, Japan

[73] Assignee: Sanyo Electric Co., Ltd., Osaka, Japan

[21] Appl. No.: 904,448

[22] Filed: May 9, 1978

[30] Foreign Application Priority Data

May 9, 1977 [JP] Japan .................. 52-54518
May 9, 1977 [JP] Japan .................. 52-54526
May 9, 1977 [JP] Japan .................. 52-54527

[51] Int. Cl.² .................................. H04N 9/12
[52] U.S. Cl. ................................. 358/21 V
[58] Field of Search ...................... 358/21 V, 148

[56] References Cited

U.S. PATENT DOCUMENTS 4,089,025  5/1978  Banker et al. .............. 358/21 V

Primary Examiner—Robert L. Richardson

Attorney, Agent, or Firm—Armstrong, Nikaido, Marmelstein & Kubovcik

[57] ABSTRACT

A composite synchronizing signal during a vertical blanking interval includes horizontal sync pulses, equalizing pulses and vertical sync pulses. A line sampling circuit includes a vertical pulse gate which detects and filters an even number of vertical sync pulses, a flyback pulse gate which filters the flyback pulses sequentially after the vertical pulse gate has filtered the even number of vertical sync pulses, and a 5-bit binary counter which counts the even number of vertical sync pulses and the flyback pulses. The line sampling circuit further includes a line decoder which produces a signal after the 5-bit binary counter has counted the even number of vertical sync pulses and a predetermined number of flyback pulses for sampling a particular line defined between the neighboring horizontal sync pulses produced during the vertical blanking interval.

12 Claims, 13 Drawing Figures

LINE SAMPLING CIRCUIT FOR TELEVISION RECEIVER

BACKGROUND OF THE INVENTION

The present invention relates to a circuit improvement for television receivers and, more particularly, to a circuit arrangement for sampling a particular line which is included at some appropriate vertical blanking interval.

A composite synchronizing signal, as shown by a waveform (a) in FIG. 1, includes horizontal sync pulses $P_1$, equlizing pulses $P_2$ and vertical sync pulses $P_3$. All of the pulses have the same amplitude but they differ in frequency and pulse width. Various lines defined between the two neighboring horizontal sync pulses $P_1$ and included within the vertical blanking interval are available for carrying various kinds of signals. For example, one type of signal is a reference signal which is commonly referred to as a vertical interval reference (VIR) signal. The VIR signal, as schematically shown in the waveform (a) in FIG. 1, is carried on line 19 of the televised image, or it could be included on some other line, or perhaps on a plurality of lines. The line in the vertical blanking interval may carry some other signals such as multiplexed voice signal and/or still picture signal. The description hereinbelow is particularly directed to a case where the line 19 carries the VIR signal.

The VIR signal, as illustrated graphically on an enlarged scale in FIG. 2 is used in the color television receiver set for automatic hue and saturation control. The VIR signal includes color burst component, chroma reference component, luminance reference component and black reference component. In order to utilize the VIR signal, it is necessary to detect and sample the particular line, that is, the line 19, carrying the VIR signal, and then, the VIR signal is detected for the comparison with the video signal.

In the step of sampling the particular line carrying the VIR signal, it is common practice to count pulses upto the particular line from a certain distinguished reference line which occurs prior to the particular line. According to one prior art, the reference line is distinguished by employing an integrating circuit having a time constant long compared with the duration of the equalizing pulse or horizontal sync pulse but not with respect to the vertical pulse width. Such integrating circuit is an RC integrating circuit in which the capacitor starts charging pulse voltage from the beginning of each field of even fields and odd fields to provide the waveform separation needed for vertical synchronization. The charged voltage across the capacitor is shown by waveforms (b) and (d) of FIG. 3 representing the even field and odd field, respectively.

When the horizontal or equalizing pulses are applied to the RC integrating circuit, they cannot be charged on the capacitor to any appreciable voltage because of the short duration of the pulsating period or because of the long time interval between the neighboring pulses.

However, when the vertical sync pulse is applied, the voltage across the capacitor can build up to a value required for triggering the circuit for detecting the reference line and/or other circuits such as vertical deflection oscillator.

Because there is a half-line difference in time between the even and odd fields (see waveforms (a) and (c) in FIG. 3), the odd field has the time interval between a first occuring equalizing pulse $P_1'$ and a final horizontal sync pulse $P_2'$ of a previous field shorter than that of the even field. Therefore, the capacitor establishes the triggering voltage more rapidly in the case of odd field than in the case of even field. Thus, the triggering moment in the odd field and that in the even field do not coincide with each other. As a consequence, the reference line detected by the RC integrating circuit may vary with respect to the difference of the field. In other words, the particular line carrying the VIR signal can be detected and sampled only in one field, even field or odd field.

Furthermore, since the charged voltage across the capacitor shows a serration, the triggering moment is apt to deviate to cause an erroneous function. Moreover, there is such a disadvantage that the RC integrating circuit requires an accurate adjustment for obtaining a predetermined time constant.

Prior art color television receivers dealing with the VIR signal containing television information, as described above, are disclosed, for example, in the U.S. Pat. Nos. 3,456,068, patented on July 15, 1969; 3,780,218, patented on Dec. 18, 1973; and 3,950,780, patented on Apr. 13, 1976.

SUMMARY OF THE INVENTION

Accordingly, a primary object of the present invention is to provide an improved circuit arrangement for sampling a particular line which is included at some appropriate vertical blanking interval.

Another object of the present invention is to provide a circuit arrangement of the above described type which detects and samples the particular line with no failure.

Yet another object of the present invention is to provide a circuit arrangement of the above described type which is stable in operation.

Further object of the present invention is to provide a circuit arrangement of the above described type which is simple in construction and can readily be manufactured at low cost.

In accordance with a preferred embodiment of the invention, a line sampling circuit is constituted by a vertical pulse gate circuit, a gate circuit, a flyback pulse gate circuit, a vertical pulse gate decoder, a 5-bit binary counter, a reset decoder and a line decoder and is so designed as to generate from the line decoder a pulse indicative of the presence of particular line. Since the line sampling circuit disclosed in the present invention is particularly directed to a system of sampling a line carrying the VIR signal, the line decoder is particularly design to detect a line carrying the VIR signal. Therefore, for better understanding of the present invention, the line decoder which detects the line carrying the VIR signal is referred to as VIR pulse decoder, hereinbelow. However, it is to be noted that the line decoder includes a circuit which produces a pulse indicative of the presence of particular line carrying the multiplexed voice signal or still picture signal.

The 5-bit binary counter counts a train of pulses produced from the vertical pulse gate circuit and the flyback gate circuit, in which the first two pulses are produced from the vertical pulse gate circuit while the remaining pulses are produced from the flyback gate circuit. The first two pulses produced from the vertical pulse gate circuit correspond with the first two vertical sync pulses contained in the composite sync pulses. Such first two vertical sync pulses are detected by a differential amplifier contained in the vertical pulse gate circuit in which each of the pulses in the composite sync pulses is converted into sawtooth pulses having different amplitude with respect to the different pulse duration of each composite sync pulses. Since the vertical sync pulses have the longest pulse duration with respect to other pulses, the sawtooth pulses converted from the vertical sync pulses show the highest amplitude. Such sawtooth pulses having the highest amplitude are detected by the differential amplifier.

BRIEF DESCRIPTION OF THE DRAWINGS

These and other objects and features of the present invention will become apparent from the following description taken in conjunction with a preferred embodiment thereof with reference to the accompanying drawings, in which.

DETAILED DESCRIPTION OF THE INVENTION

Figure 1:
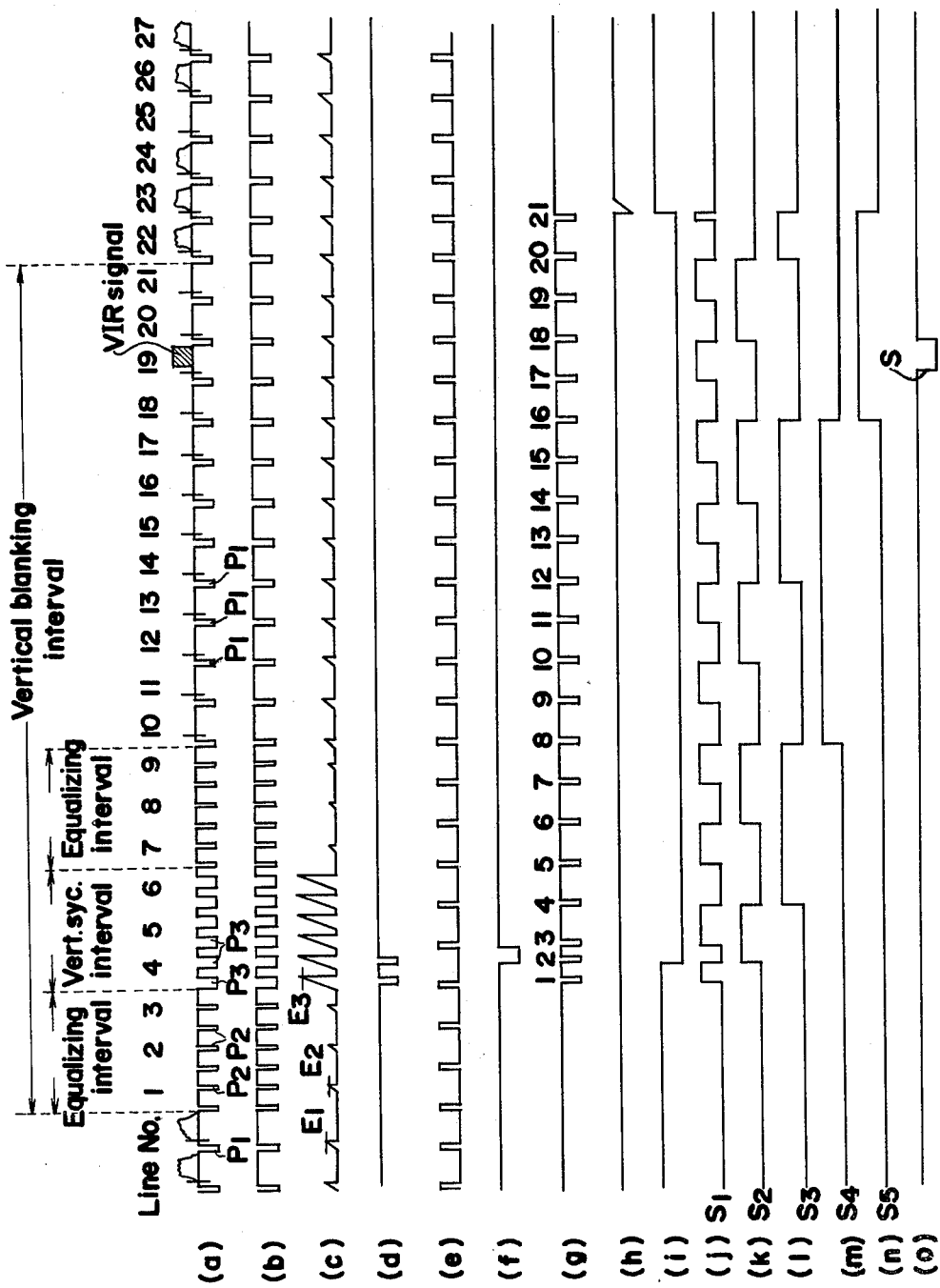
FIG. 1 is a graph showing waveforms of signals obtained from a television receiver and also from a verious places in a line sampling circuit of the present invention.
Figure 2:
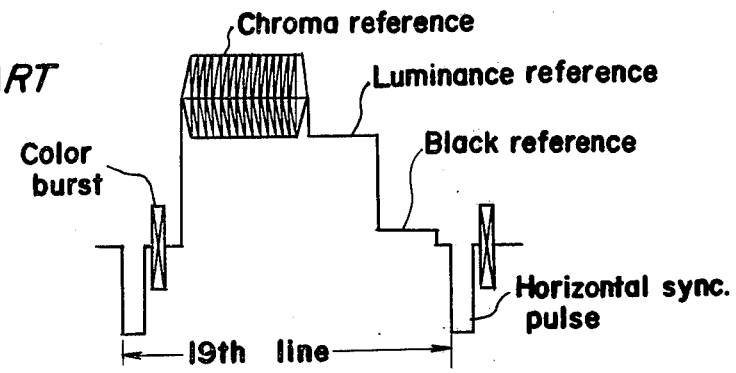
FIG. 2 is a graphic representation of the VIR signal component included as part of the televised signal.
Figure 3:
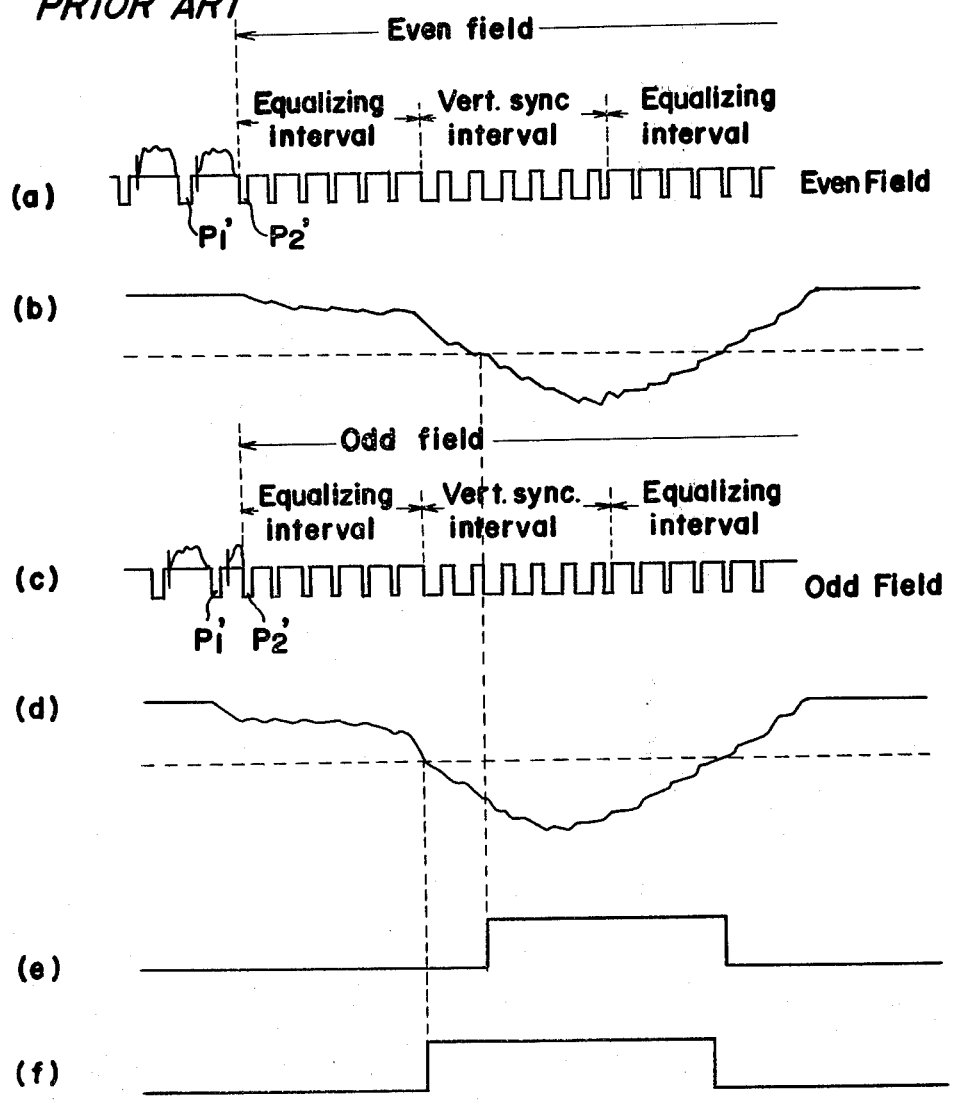
FIG. 3 is a graph showing waveforms of signals obtained from one line sampling circuit according to the prior art.

Before the description of the present invention proceeds, it is to be noted that like parts are designated by like reference numerals throughout the accompanying drawings.

Figure 4:
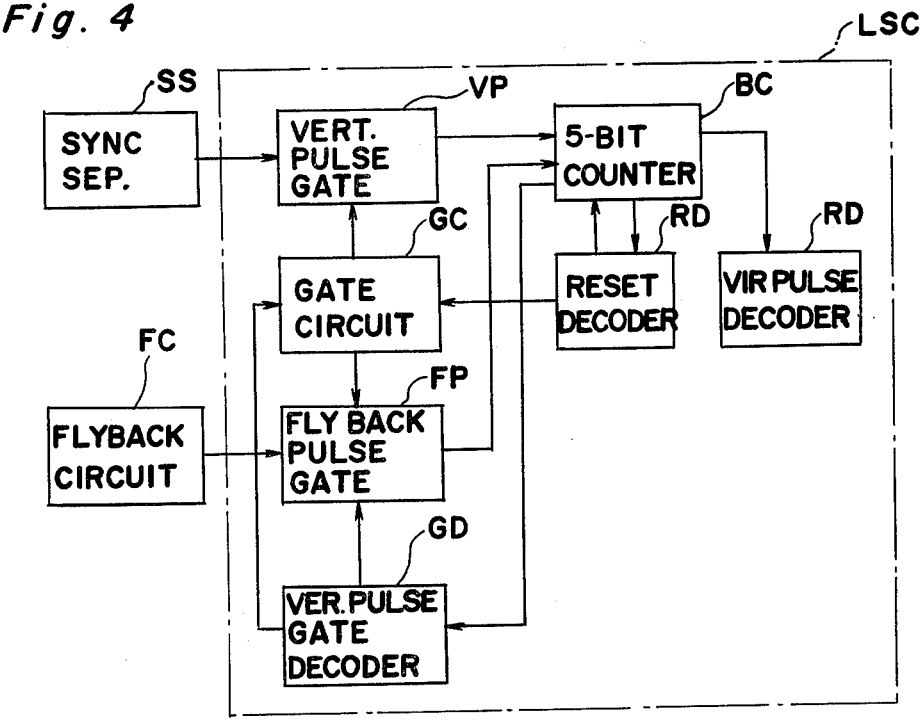
FIG. 4 is a block diagram of a line sampling circuit of the present invention.

Referring now to FIG. 4, there is shown a circuit block diagram of a line sampling circuit LSC of the present invention. The line sampling circuit LSC comprises a vertical sync pulse gate circuit VP, a gate circuit GC, a flyback pulse gate circuit FP, a vertical sync pulse gate decoder GD, a 5-bit binary counter BC, a reset decoder RD and a VIR pulse decoder PD. The vertical pulse gate circuit VP receives composite sync pulses (FIG. 1, waveform (b)) produced from a sync separator SS and detects only the vertical sync pulses which are fed to the 5-bit counter BC. The vertical pulse gate decoder GD connected to the 5-bit counter BC produces an appropriate signal after the 5-bit counter BC counts an even number of vertical sync pulses, such as two vertical sync pulses. Upon receipt of the appropriate signal from the vertical pulse gate decoder GD, the gate circuit GC controls the vertical pulse gate VP to cease feeding further vertical sync pulses to the 5-bit counter BC and also actuates the flyback pulse gate FD. Upon actuation of the flyback pulse gate FD, a horizontal flyback pulse (FIG. 1, waveform (e)) produced from a flyback circuit FC is applied to the 5-bit counter BC. It is to be noted that the flyback pulse can be replaced by any other types of pulses which occur on every horizontal interval. Such types of pulses are generally called horizontal frequency pulses. Accordingly, the 5-bit counter BC receives two vertical sync pulses (FIG. 1, waveform (d)) from the vertical pulse gate VP and, thereafter, receives a train of flyback pulses from the flyback pulse gate FD. As a consequence, the 5-bit counter BC receives a train of pulses, the waveform of which is shown by (g) in FIG. 1. The VIR pulse decoder PD connected to the 5-bit counter BC produces a pulsating signal S (FIG. 1, waveform (o)) after the 5-bit counter BC has counted seventeen pulses. The pulse duration of the pulsating signal S produced from the VIR pulse decoder PD is equal to one line horizontal scanning period, that is, 1 H, so that the pulsating signal S covers the line 19 carrying the VIR signal.

The reset decoder RD connected to the 5-bit counter BC produces a reset signal (FIG. 1, waveform (h)) after the 5-bit counter BC has counted twenty-one pulses. Such reset signal is applied to 5-bit counter BC and to the gate circuit GC for resetting the line sampling circuit LSC to return to the initial condition, in which condition, the vertical pulse gate VP is ready to count the vertical sync pulses in the succeeding field.

Figure 5:
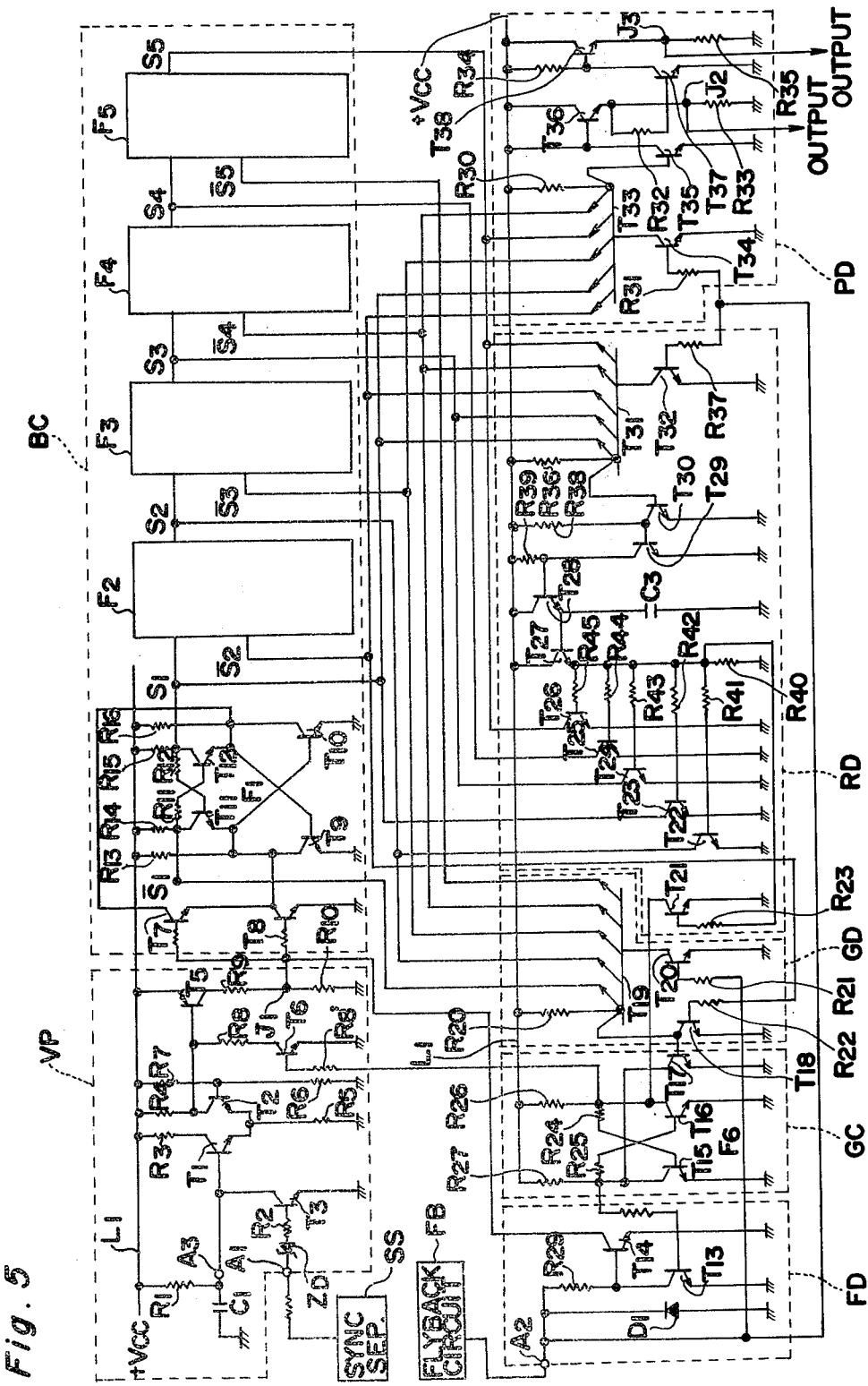
FIG. 5 is a circuit diagram showing one embodiment of the line sampling circuit shown in FIG. 4.

Referring to FIG. 5, there is shown a circuit diagram of the line sampling circuit LSC described above. The vertical pulse gate VP includes an emitter grounded transistor $T_3$ having its base thereof connected to a first terminal $A_1$ through a resistor $R_2$ and a Zener diode ZD and, in turn, to the sync separator SS. The resistor $R_2$ and the Zener diode ZD are provided for eliminating the noise. Since the composite sync pulses (FIG. 1, waveform (b)) applied to the base of the transistor $T_3$ are negative pulses, the transistor $T_3$ is turned off during the presence of any one of horizontal sync pulses $P_1$, equalizing pulses $P_2$ and vertical sync pulses $P_3$.

A pair of transistors $T_1$ and $T_2$ forming a differential amplifier is connected between a power supplying line $L_1$ and ground through suitable resistors. More particularly, the collector of the transistor $T_1$ is connected to the power line $L_1$ through a resistor $R_3$ and the collector of the transistor $T_2$ is connected to the power line $L_1$ through a resistor $R_4$. The emitters of the transistors $T_1$ and $T_2$ are connected to each other and are further connected to the ground through a resistor $R_5$. The base of the transistor $T_2$ is supplied with a predetermined voltage $E_x$ obtained from a junction between resistors $R_6$ and $R_7$ which are connected in series between the power line $L_1$ and the ground. Such predetermined voltage $E_x$ can be expressed as follows:

$$E_x = R_6/(R_6 + R_7)$$

in which $R_6$ and $R_7$ are resistance of the resistors designated by the same characters. On the other hand, the base of the transistor $T_1$ is connected to a terminal $A_3$ and also to the collector of the transistor $T_3$. The terminal $A_3$ is connected to a capacitor $C_1$ and in turn to the ground and, also to the power line $L_1$ through a resistor $R_1$.

When the transistor $T_3$ is turned on, a current flows from the power line $L_1$ through the resistor $R_1$ and said transistor $T_3$ to the ground and, at the same time, the voltage charged in the capacitor $C_1$ is discharged through said transistor $T_3$. Therefore, the base of the transistor $T_1$ receives no biasing voltage. On the other hand, when the transistor $T_3$ is switched off, the voltage Vcc appearing on the power line $L_1$ is applied to the capacitor $C_1$. Therefore, the capacitor $C_1$ establishes a voltage thereacross with respect to the time constant determined by the resistor $R_1$ and the capacitor $C_1$. Such charged voltage across the capacitor $C_1$ is applied to the base of the transistor $T_1$. A waveform (c) in FIG. 1 shows the voltage charged across the capacitor $C_1$. As apparent from the waveform (c), the capacitor $C_1$ is charged with the highest voltage $E_3$ when the vertical sync pulses $P_3$ are applied to the transistor $T_3$. On the other hand, the capacitor $C_1$ is charged with the lowest voltage $E_2$ when the equalizing pulses $P_2$ are applied to the transistor $T_3$. When the horizontal sync pulses $P_1$ are applied to the transistor $T_3$, the capacitor $C_1$ is charged to a voltage level $E_1$ which is slightly higher than the voltage level $E_2$.

When the predetermined voltage $E_x$ satisfies the following equation;

$$E_2 < E_x < E_3$$

a train of positive pulses, coinciding with the vertical sync pulses, appear on the collector of the transistor $T_2$. Such trains of positive pulses are applied to the base of a transistor $T_5$ which is connected between the power line $L_1$ and the ground through a series-connected resistors $R_9$ and $R_{10}$ for producing a train of negative pulses from the collector of the transistor $T_5$ in opposite phase to the phase of said train of positive pulses. The train of negative pulses are taken out from a junction $J_1$ between the resistors $R_9$ and $R_{10}$ and fed to the 5-bit counter BC.

The vertical pulse gate VP further includes a transistor $T_6$ connected between the collector of the transistor $T_2$, through a resistor $R_8$, and the ground, and also a resistor $R_8'$ which is connected to the base of the transistor $T_6$. The function of these transistor $T_6$ and resistors $R_8$ and $R_8'$ are described later in connection with the description for the gate circuit GC.

The 5-bit counter BC includes five flip-flop circuits $F_1$, $F_2$, $F_3$, $R_4$ and $F_5$ corrected in series and, each formed in a so-called "T-network". Since the five sets of T-formation flip-flop circuits have exactly the same arrangement with each other, only one flip-flop circuit $F_1$ is explained in detail while others are omitted for the sake of brevity.

The flip-flop circuit $F_1$ includes a pair of transistors $T_{11}$ and $T_{12}$ and another pair of emitter grounded transistors $T_9$ and $T_{10}$. The base of the transistor $T_{11}$ is connected, through a resistor $R_{12}$, to the collector of the transistor $T_{12}$ and, in turn, connected to the power line $L_1$ through a resistor $R_{15}$. In the same manner, the base of the transistor $T_{12}$ is connected to the collector of the transistor $T_{11}$ through a resistor $R_{11}$ and, in turn, connected to the power line $L_1$ through a resistor $R_{14}$. The emitter of the transistor $T_{11}$ is connected to the base of the transistor $T_{10}$, to the collector of the transistor $T_9$ and, also to the power line $L_1$ through a resistor $R_{13}$. Likewise, the emitter of the transistor $T_{12}$ is connected to the base of the transistor $T_9$, to the collector of the transistor $T_{10}$ and, also to the power line $L_1$ through a resistor $R_{16}$.

The flip-flop circuit $F_1$ described above is so designed as to produce output signals from terminals $S_1$ and $\overline{S_1}$. The signals produced from such output terminals $S_1$ and $\overline{S_1}$ are in the form of binary signal, which may be either high level binary signal or low level binary signal. The signal produced from one output terminal $S_1$ is in opposite phase to the signal produced from the other output terminal $\overline{S_1}$. The flip-flop circuit $F_1$ is initially so designed as to produce low level signal from the output terminal $S_1$ and changes the level of output signals thereof upon receipt of one vertical sync pulse or one flyback pulse through transistors $T_7$ and $T_8$. The bases of the transistors $T_7$ and $T_8$ are connected to the junction $J_1$ in the vertical pulse gate VP through suitable resistors. The base of the transistor $T_8$ is connected to the ground and the collector thereof is connected to the emitter of the transistor $T_7$ and also to the collector of the transistor $T_9$. The collector of the transistor $T_7$ is connected to the collector of the transistor $T_{10}$.

Starting from the initial state of the flip-flop circuit $F_1$ in which the output terminal $S_1$ is in a low level state and the output terminal $\overline{S_1}$ is in a high level state, the transistor $T_{11}$ is switched off and the transistor $T_{12}$ is switched on. Therefore, the emitter current of the transistor $T_{12}$ flows to the ground through the transistors $T_7$ and $T_8$. Upon receipt of negative pulse to the bases of the tranditors $T_7$ and $T_8$ from the junction $J_1$, these transistors $T_7$ and $T_8$ are turned off to interrupt the emitter current of the transistor $T_{12}$ to flow towards the ground. Thus, the emitter current of the transistor $T_{12}$ flows towards the base of the transistor $T_9$. Thereupon, the transistor $T_9$ is turned on and, as a result, a biasing voltage is generated across the base and the emitter of the transistor $T_{11}$. As a consequence, the flip-flop circuit $F_1$ is turned to another state, in which the transistor $T_{11}$ is switched off and the transistor $T_{12}$ is switched on.

In this flip-flop circuit $F_1$, two negative pulses are needed to complete one cycle operation, that is, to switch the circuit back and forth between its two states.

The waveforms of the output signals from the terminals $S_1$, $S_2$, $S_3$, $S_4$ and $S_5$ of the respective flip-flop circuits are shown by waveforms (j) to (n) in FIG. 1.

The vertical pulse gate decoder GD includes a multi-emitter transistor or decoder transistor $T_{19}$ having base thereof grounded through a transistor $T_{20}$. The base of the transistor $T_{20}$ is connected, through a resistor $R_{21}$ to the terminal $A_2$. The transistor $T_{19}$ has five sets of emitters which are connected to output terminals $\overline{S_1}$, $S_2$, $\overline{S_3}$, $S_4$ and $\overline{S_5}$ of the respective flip-flop circuits. When and only when the 5-bit counter BC counts two negative pulses received from the vertical pulse gate VP, all of the output terminals $\overline{S_1}$, $S_2$, $\overline{S_3}$, $S_4$ and $\overline{S_5}$ show high output level. Thus, the emitter voltage of the multi-emitter transistor $T_{19}$ presents approximately equal voltage to the biasing voltage applied to the base of the transistor $T_{19}$ through the resistor $R_{20}$ for interrupting the collector-emitter current of the transistor $T_{19}$. Accordingly, the biasing voltage appearing on the base of the transistor $T_{19}$ is applied to the base of the transistor $T_{17}$ through the collector of the transistor $T_{19}$. The vertical pulse gate decoder GD further includes an emitter grounded transistor $T_{18}$ having its base connected to the output terminal $\overline{S_2}$ through a resistor $R_{22}$ and its collector connected to the base of the transistor $T_{17}$.

The gate circuit GC includes the transistor $T_{17}$ and a set of flip-flop circuit $F_6$ having a pair of emitter grounded transistors $T_{15}$ and $T_{16}$. The base of the transistor $T_{15}$ is connected, through a resistor $R_{24}$, to the collector of the transistor $T_{16}$. In the same manner, the base of the transistor $T_{16}$ is connected to the collector of the transistor $T_{15}$ through a resistor $R_{25}$. The collectors of the transistors $T_{15}$ and $T_{16}$ are connected to the power line $L_1$ through resistors $R_{27}$ and $R_{26}$, respectively. Upon turning on the transistor $T_{17}$ by the triggering pulse produced from the multi-emitter transistor $T_{19}$, the base of the transistor $T_{16}$ is grounded through the resistor $R_{25}$ to turn off the same. At the same time, the transistor $T_{15}$ is turned on. Thereupon, a high voltage level appearing at the collector of the transistor $T_{16}$ is applied to the base of the transistor $T_6$ employed in the vertical pulse gate VP to ground the collector of the transistor $T_2$. Therefore, only two of the train of positive pulses produced from the collector of the transistor $T_2$ is transmitted to the base of the transistor $T_5$ and, thus, only two negative pulses (FIG. 1, waveform (d)) appear at the junction $J_1$. On the other hand, a low voltage level appearing at the collector of the transistor $T_{15}$ is applied to a transistor $T_{13}$ through a resistor $R_{28}$ provided in the flyback pulse gate FD.

The flyback pulse gate FD includes emitter grounded transistors $T_{13}$ and $T_{14}$ in which the collector of the transistor $T_{13}$ is connected to the base of the transistor $T_{14}$. The base of the transistor $T_{14}$ is also connected, through a resistor $R_{29}$, to a terminal $A_2$ for receiving the flyback pulses. The collector of the transistor $T_{14}$ is connected to the bases of the transistors $T_7$ and $T_8$ through suitable resistors for supplying negative flyback pulses to the 5-bit counter BC after the vertical pulse gate supplies two negative pulses. The flyback pulse gate FD further includes a reverse biased diode $D_1$ connected between the terminal $A_2$ and the ground. Upon receipt of low voltage level signal from the collector of the transistor $T_{15}$, the transistor $T_{13}$ is turned off for applying pulsating voltage of the flyback pulses to the base of the transistor $T_{14}$. Thereupon, the transistor $T_{14}$ generates, from the collector thereof, a negative flyback pulses which are fed to the junction $J_1$. Accordingly, the 5-bit counter receives a train of negative pulses as shown by a waveform (g) in FIG. 1. It is needless to say that, in the waveform (g), the first two negative pulses are obtained from the vertical pulse gate VP, while the remaining pulses are obtained from the flyback pulse gate FD.

Figure 6:
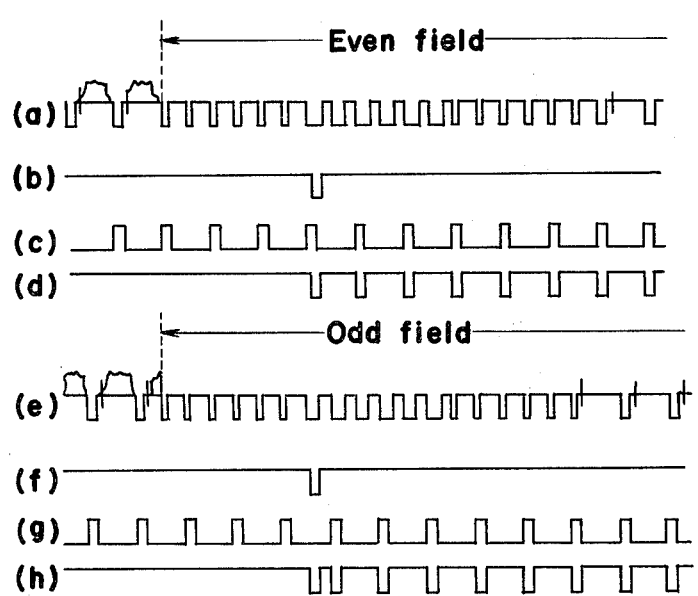
FIG. 6 is a graph showing waveforms presented for explaining the line sampling circuit shown in FIG. 5.
Figure 7:
FIG. 7 is a graph showing a waveform produced from a differential circuit employed in the vertical pulse gate circuit in the line sampling circuit of the present invention.

It is to be noted that the number of the pulses fed to the 5-bit counter from the vertical pulse gate VP is not limited to two, but may be more than two as long as the number of pulses is an even number such as four, or six. If the number of pulses is an odd number such as one, the waveform of the train of negative pulses received by the 5-bit counter BC would be different with respect to the difference in the field, that is, even field and odd field. FIG. 6 shows waveforms of an erroneous operation, in which the 5-bit counters receive only one negative pulse (FIG. 6, waveforms (b) and (f)). In the case of even field, the one negative pulse filtered through the vertical pulse gate VP coincides with one of the flyback pulses. On the other hand, in the case of odd field, the one negative pulse from the vertical pulse gate VP deviates from any of the flyback pulses. Therefore, when the negative pulses filtered through the vertical pulse gate VP and the negative pulses filtered through the flyback pulse gate FD are gathered, the number of trains of pulses (FIG. 6, waveform (h)) obtained during the sequence of odd field is greater in number by one pulse in comparison to the number of trains of pulses (FIG. 6, waveform (d)) obtained during the sequence of even field. In order to detect one particular line by counting such train of pulses, it is necessary to produce the same number of pulses within the same period of time. Accordingly, such difference in number of pulses between the even and odd fields would result in difference in detected line. From this aspect, the pulses filtered through the vertical pulse gate VP is arranged in the even number of pulses. According to a preferred embodiment, the number of pulses filtered through the vertical pulse gate is two because of the following reason. In a circuit dealing with a minor amount of voltage and electric field, as in the vertical pulse gate VP, the gain of pulses produced from the collector of the transistor $T_2$ are apt to decrease in amplitude, as shown in FIG. 7. Therefore, in order to ensure the operation of vertical pulse gate VP, particularly, the transistor $T_5$, it is preferable to use two negative pulses shown at the left-hand side in FIG. 7.

The VIR pulse decoder PD includes a multi-emitter transistor $T_{33}$ having the base thereof connected to the emitter-grounded transistor $T_{34}$. The base of the transistor $T_{34}$ is connected through a resistor $R_{31}$ to the terminal $A_2$. The multi-emitter transistor $T_{33}$ has five sets of emitters which are connected to the output terminals $S_1$, $\overline{S_2}$, $\overline{S_3}$, $\overline{S_4}$ and $S_5$ of the respective flip-flop circuits. When and only when the 5-bit counter BC counts 17 pulses received from the vertical pulse gate VP, all of the output terminals $S_1$, $\overline{S_2}$, $\overline{S_3}$, $\overline{S_4}$ and $S_5$ show high output level. Thus, the emitter voltage of the multi-emitter transistor $T_{33}$ presents approximately equal voltage to the biasing voltage applied to the base of the transistor $T_{33}$ though the resistor $R_{30}$ for interrupting the collector-emitter current of the transistor $T_{33}$. In other words, the multi-emitter transistor $T_{33}$ is switched off. Accordingly, the biasing voltage appearing on the base of the transistor $T_{33}$ is applied to the base of an emitter-grounded transistor $T_{35}$ through the collector of the transistor $T_{33}$. The collector of the transistor $T_{35}$ is connected to the power line $L_1$ and also to the base of a transistor $T_{36}$. The collector of the transistor $T_{36}$ is connected to the power line $L_1$ and the emitter theereof is connected to the ground through a resistor $R_{33}$. At a junction $J_2$ between the emitter of the transistor $T_{36}$ and the resistor $R_{33}$, there is produced a negative pulsating signal S (FIG. 1, waveform (o)) having the pulse duration coinciding with the line 19 carrying the VIR signal.

The pulse decoder PD further includes an emitter grounded transistor $T_{37}$ having base thereof connected, through a resistor $R_{32}$, to the emitter of the transistor $T_{36}$. The collector of the transistor $T_{37}$ is connected to the power line $L_1$ through a resistor $R_{34}$ and also to the base of a transistor $T_{38}$. The collector of the transistor $T_{38}$ is connected to the power line $L_1$ and the emitter thereof is connected through a resistor $R_{35}$ to the ground. At a junction $J_3$ between the emitter of the transistor $T_{38}$ and the resistor $R_{35}$, there is produced a positive pulsating signal which is exactly in opposite phase to the phase of the negative pulsating signal S described above.

It is to be noted here that the output signals produced from the junctions $J_2$ and $J_3$ are provided to the next stage circuit (not shown) which may be so designed as to separate the VIR signal from the composite sync pulses, or any other circuit which utilizes the VIR signal.

It is also to be noted that the pulse decoder PD described as producing two output signals in opposite phase may produce only one output signal depending on the type of circuit connected in the next stage.

Since the transistor $T_{34}$ connected to the base of the transistor $T_{33}$ is switched on during the presence of flyback pulses, the bases of the transistors $T_{33}$ and $T_{35}$ are grounded through the transistor $T_{34}$ during the presence of flyback pulses. In other words, the transistor $T_{35}$ is controlled only during the absence of the flyback pulses. Accordingly, the pulse produced from the collector of the transistor $T_{33}$ has a pulse duration exactly equal to the one line period 1 H, which excludes the flyback pulse duration.

Figure 8:
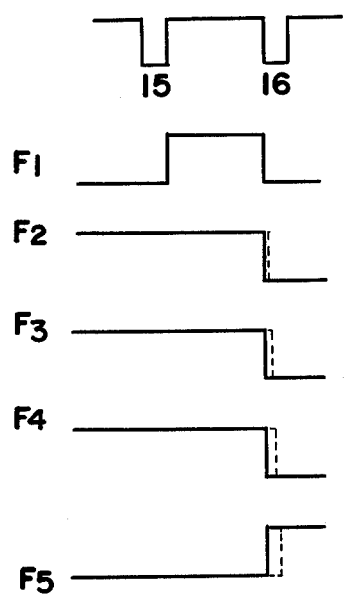
FIG. 8 is a graph showing waveforms produced from each of flip-flop circuits employed in the 5-bit binary counter in the line sampling circuit of the present invention.

The reason for employing the transistor $T_{34}$ for controlling the transistor $T_{33}$ is described hereinbelow. Generally, counters employing a logical circuit such as AND circuit feed the output thereof back to the input of the counter for taking the synchronization. However, the counters which do not feed back the output, in other words, the counters of non-synchronizing type do not need any feed back system, but often result in complicated structure. From this aspect, the counter of the present invention shown in FIG. 5 has a simple structure and, yet, no feed back system is employed. Since the counter employed in the line sampling circuit LSC of the present invention does not feed the output signal back to the input of the counter, the signal produced from each of the flip-flop circuits are apt to delay in time, particularly, the flip-flop circuits positioned further away from the first flip-flop circuit $F_1$. FIG. 8 shows the outputs of the flip-flop circuits $F_1$ to $F_5$ upon receipt of sixteenth flyback pulse to the first flip-flop circuit $F_1$. The waveforms in real line represent the ideal waveforms and the waveforms in broken line represent the actual waveforms produced from respective flip-flop circuits. As apparent from the waveforms of FIG. 8, the response of each flip-flop circuit delays in time. Such delay in response results in pulse deviation which may disadvantageously switch off the multi-emitter transistor $T_{33}$ at unexpecting moments. For preventing the transistor $T_{33}$ from operating at such unexpecting moments, the transistor $T_{33}$ controls the transistor $T_{35}$ only during the absence of the flyback pulses, that is, during the flyback pulse intervals, by the switching operation of the transistor $T_{34}$ connected to the base of the transistor $T_{33}$. Accordingly, the multi-emitter transistor $T_{33}$ is responsive only during the pulsating period given by the real line in FIG. 8. With such arrangement, the time delay resulted from each of the flip-flop circuits gives no erroneous operation in the 5-bit counter. Furthermore, the time duration between the neighboring flyback pulses, particularly between the flyback pulses 17 and 18 as numbered in the waveform (g) shown in FIG. 1, is long enough to include the time duration of VIR signal.

For the same purpose, the switching transistor $T_{20}$ provided in the vertical pulse gate decoder GD controls the multi-emitter transistor $T_{19}$ in the same manner described above. Furthermore, a switching transistor $T_{32}$ provided in the reset decoder RD described hereinbelow controls a multi-emitter transistor $T_{31}$ in the same manner.

Referring back to FIG. 5, the reset decoder RD includes the multi-emitter transistor $T_{31}$ having its base connected to the emitter-grounded transistor $T_{32}$ which controls the operation of the multi-emitter transistor $T_{31}$. The base of the transistor $T_{32}$ is connected through a resistor $R_{37}$ to the terminal $A_2$ for applying the flyback pulses to the transistor $T_{32}$. The multi-emitter transistor $T_{31}$ has five sets of emitters which are connected to output terminals $S_1$, $\overline{S_2}$, $S_3$, $\overline{S_4}$ and $S_5$ of the respective flip-flop circuits. When and only when the 5-bit counter BC counts twenty-one negative pulses received from the vertical pulse gate VP and the flyback pulse gate FD, all of the output terminals $S_1$, $\overline{S_2}$, $S_3$, $\overline{S_4}$ and $S_5$ show high output level for switching off the transistor $T_{31}$. Therefore, the multi-emitter transistor $T_{31}$ receiving high voltage from the power line $L_1$ through a resistor $R_{36}$ produces a triggering signal from the collector thereof which is, in turn, applied to the base of an emitter-grounded transistor $T_{30}$. The collector of the transistor $T_{30}$ is connected to the power line $L_1$ through a resistor $R_{38}$ and also to the base of an emitter-grounded transistor $T_{29}$. The collector of the transistor $T_{29}$ is connected to the power line $L_1$ through a resistor $R_{39}$. Upon receipt of the triggering signal from the multi-emitter transistor $T_{31}$, the transistors $T_{30}$ and $T_{29}$ are sequentially turned on and off, respectively. In other words, upon receipt of positive triggering pulse signal from the multi-emitter transistor $T_{31}$, the transistor $T_{29}$ produces an amplified positive triggering pulse signal towards a reset pulse generator. The reset pulse generator includes a transistor $T_{28}$ having its base connected to the collector of the transistor $T_{29}$, a capacitor $C_3$ connected between the ground and the emitter of the transistor $T_{28}$, a transistor $T_{27}$ having its base connected to the emitter of the transistor $T_{28}$ and a resistor $R_{46}$ connected between the ground and the emitter of the transistor $T_{27}$. The collectors of the transistors $T_{27}$ and $T_{28}$ are connected to the power line $L_1$. Upon receipt of the amplified positive triggering pulse signal, the transistor $T_{28}$ is turned on to charge the capacitor $C_3$. The charged voltage across the capacitor $C_3$ is applied to the base of the transistor $T_{27}$ to generate the reset pulse (FIG. 1, waveform (h)) from the collector of the transistor $T_{27}$. Such reset pulse is applied to the bases of respective emitter-grounded transistors $T_{21}$, $T_{22}$, $T_{23}$, $T_{24}$, $T_{25}$ and $T_{26}$ through suitable resistors $R_{23}$, $R_{40}$, $R_{41}$, $R_{42}$, $R_{43}$ and $R_{44}$, respectively.

The collector of the transistor $T_{21}$ is connected to the collector of the transistor $T_{16}$ provided in the gate circuit GC. Upon receipt of the reset pulse from the transistor $T_{27}$, the transistor $T_{21}$ is turned on for turning the transistor $T_{16}$ on and, at the same time, turning the transistor $T_{15}$ off. Thus, the flip-flop circuit $F_6$ is set to another state. Thereupon, the transistor $T_{13}$ is turned off and the transistor $T_{14}$ is turned on for interrupting the further application of flyback pulses to the 5-bit counter BC. It is to be noted that a control signal produced from the collector of the transistor $T_{15}$ is a negative pulse (FIG. 1, waveform (i)) having a considerably long pulse duration, while a control signal produced from the collector of the transistor $T_{16}$ is a positive pulse having an exactly opposite phase to the phase of the negative pulse mentioned above.

The collectors of the transistors $T_{22}$, $T_{23}$, $T_{24}$, $T_{25}$ and $T_{26}$ are connected to terminals $S_2$, $S_1$, $S_3$, $S_4$ and $S_5$ of the respective flip-flop circuits. Upon receipt of the reset pulse from the transistor $T_{27}$, all of the transistors $T_{22}$ to $T_{26}$ are turned on for establishing low level signal on the collectors of respective transistors $T_{22}$ to $T_{26}$. Therefore, the terminals $S_1$, $S_2$, $S_3$, $S_4$ and $S_5$ are provided with low level signals for resetting the respective flip-flop circuits in the initial state.

It is to be noted that the capacitor $C_3$ arranged in the reset pulse generator is provided for reforming the pulse applied to the base of the transistor $T_{28}$. In the case where the pulse applied to the base of the transistor $T_{28}$ has considerably small pulse duration, the flip-flop circuits may fail to reset to the initial state. However, upon insertion of the capacitor $C_3$ between the transistor $T_{28}$ and the ground, the pulse voltage produced from the transistor $T_{28}$ is temporarily charged in the capacitor $C_3$. Since the charged voltage across the capacitor $C_3$ is discharged through base-emitter of the transistor $T_{27}$ having comparatively high impedance, the time constant determined by the capacitance of the capacitor $C_3$ and the impedance between the base-emitter of the transistor $T_{27}$ is comparatively large. Accordingly, the time required for discharging the capacitor $C_3$ is comparatively long with respect to the pulse duration of the pulse applied to the transistor $T_{28}$. From this aspect, the capacitance of the capacitor $C_3$ may be comparatively small and, yet obtaining enough long time constant for triggering the flip-flop circuits. For example, according to one preferred embodiment, the capacitance of the capacitor $C_3$ may be as small as 5pF. Therefore, such capacitor $C_3$ having small capacitance can be simply arranged in an integrated circuit without occupying a large space.

As it is fully described above, the line sampling circuit of the present invention samples the particular line with high reliability, with respect to odd and even fields, since the vertical pulse gate VP provides an even number of pulses corresponding to the vertical sync pulses with no failure.

Figure 9:
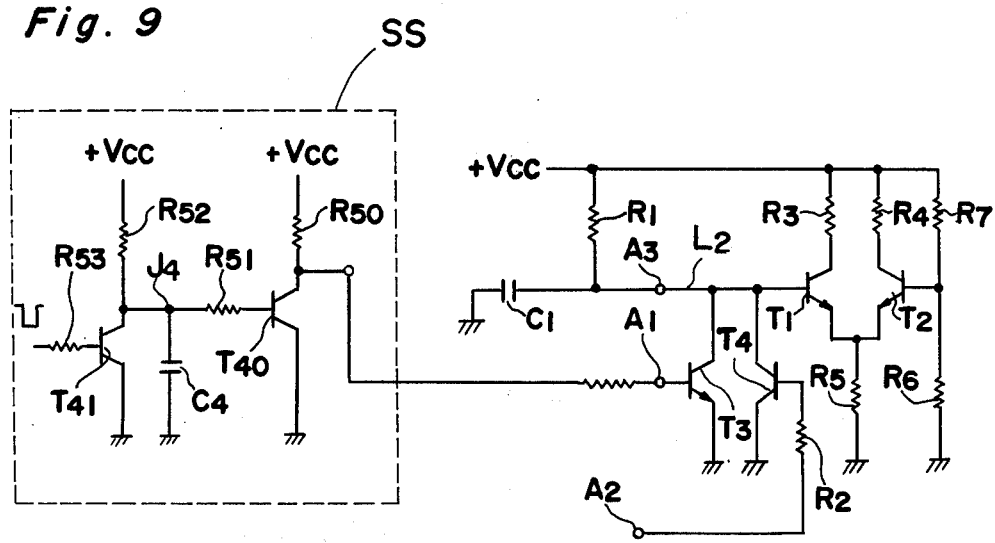
FIG. 9 is a circuit diagram showing a modification of a portion of vertical pulse gate circuit.

Referring now to FIG. 9, there is shown a circuit which is a modification of a portion of the vertical pulse gate VP. The circuit of this embodiment further includes an emitter-grounded transistor $T_4$ having its collector connected to a lead line $L_2$, extending from the base of the transistor $T_1$, and its base connected to the terminal $A_2$ through a resistor $R_2$. During the presence of flyback pulse, the transistor $T_4$ is switched on for connecting the lead line $L_2$ to the ground. The employment, and the resulting advantage, of such transistor $T_4$ are based on the following reason.

Figure 10:
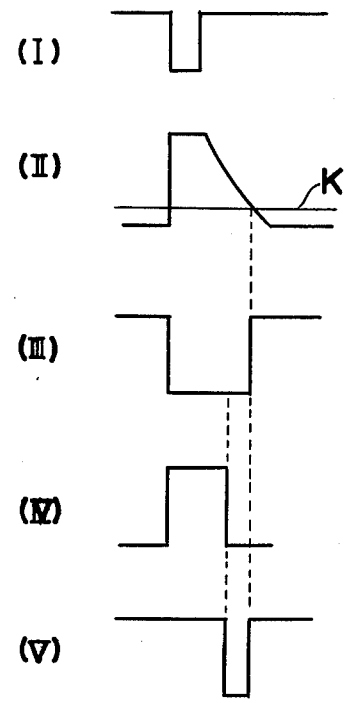
FIG. 10 is a graph showing waveforms produced from the circuit shown in FIG. 9.

According to one conventional television receiver set, the composite sync signal is produced from a sync separator SS as shown in the left-hand side of FIG. 9. The sync separator SS includes transistors $T_{40}$ and $T_{41}$ and a capacitor $C_4$. In the sync separator SS which deals with weak electric field, the peak value of the composite sync signal is apt to vary under the influence of variation in environmental electric field. Thus, the reproduced dc current level is varied. From this point of view, a pulse (FIG. 10, waveform (i)) applied to the base of the transistor $T_{41}$ is more or less integrated by the capacitor $C_4$. Therefore, a pulse (FIG. 10, waveform (ii)) appearing at a junction $J_4$ *L in FIG. 9 results in wide pulse at a threshold level K of the transistor $T_{40}$* with respect to the pulse duration of the original pulse, that is, the pulse applied to the base of the transistor $T_{41}$. As a consequence, a pulse (FIG. 10, waveform (iii)) applied to the base of the transistor $T_3$ has a longer pulse duration than that of the original pulse applied to the transistor $T_{41}$.

In the case where the original pulse is the equalizing pulse, the widened pulse resulted therefrom may not be so wide as the vertical sync pulse width. However, in the case where the original pulse is horizontal sync pulse, the widened pulse applied to the base of the transistor $T_3$ will become approximately equal to the pulse duration of the vertical sync pulse. Thus, the capacitor $C_1$ charged during the presence of such widened pulse establishes thereacross a high voltage which may possibly exceed the voltage level $E_x$ described above. As a result, the differential amplifier produces an erroneous signal from the collector of the transistor $T_2$. However, if the transistor $T_4$ is employed such as shown in FIG. 9, the lead line $L_2$ is connected to the ground during the presence of the flyback pulses through this transistor $T_4$. Since the flyback pulse (FIG. 10, waveform (iv)) partly coincides with the widened pulse (FIG. 10, waveform (iii)), the time during when the capacitor $C_1$ is charged is only the remaining period obtained by subtracting the pulse duration of the flyback pulse from the pulse duration of widened pulse. Such remaining period corresponds to the pulse duration of a pulse shown by waveform (v) in FIG. 10, which is much shorter than the pulse duration of the vertical sync pulse. Accordingly, there is no possibility of producing the erroneous signal from the transistor $T_2$ during the presence of the horizontal sync pulse.

Figure 11:
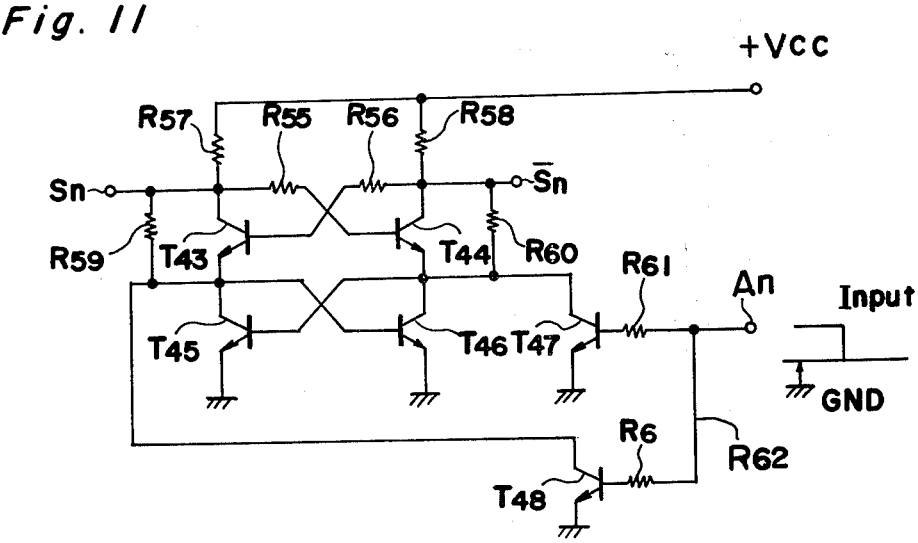
FIG. 11 is a circuit diagram showing a modification of a flip-flop circuit employed in the 5-bit binary counter.

Referring to FIG. 11, there is shown a flip-flop circuit which is a modification of flip-flop circuit described above with reference to FIG. 5. The flip-flop circuit in this modification includes transistors $T_{43}$, $T_{44}$, $T_{45}$ and $T_{46}$ in which the transistors $T_{43}$ and $T_{44}$ constitute a primary flip-flop while the transistors $T_{45}$ and $T_{46}$ constitute a steering flip-flop. These flip-flops are so associated with each other that, when a low level pulse is applied to an input terminal $A_n$ while the transistors $T_{43}$ and $T_{44}$ are respectively held in conductive and nonconductive states, drive transistors $T_{47}$ and $T_{48}$ are gradually switched off in a period of time determined by the time required for the low level input pulse to full. During this period of time, since the transistors $T_{47}$ and $T_{48}$ undergo a linear operation, the transistors $T_{43}$ and $T_{44}$ constituting the primary flip-flop maintain the conductive and non-conductive states, respectively. However, when the emitter potential of the transistor $T_{43}$ subsequently becomes substantially equal to the base-emitter voltage $V_f$, the transistor $T_{46}$ becomes forced to conduct and, consequently, the voltage appearing at an output terminal $S_n$ becomes equal to the sum of the base-emitter voltage $V_f$ of the transistor $T_{43}$ and the saturated collector-emitter voltage VcEsat of the transistor $T_{43}$ so that a relatively small amount of base current is supplied to the transistor $T_{44}$. Therefore, the transistor $T_{44}$ is forced to conduct accompanying reduction in potential at the output terminal $S_n$, the consequence of which is that the base current to be supplied to the transistor $T_{43}$ becomes reduced. Thereupon, the collector potential of the transistor $T_{43}$ increases with consequent increase of the base current to be supplied to the transistor $T_{44}$, thereby establishing a positive feedback loop which serves to interrupt conduction of the transistor $T_{43}$ which results in conduction of the transistor $T_{44}$. Resistors $R_{59}$ and $R_{60}$ serve to enhance this operation as can be understood from the fact that, when the emitter potential of the transistor $T_{43}$ attains the voltage $V_f$, the current of a value equal to VcEsat/$R_5$ (wherein $R_5$ is the resistance of the resistor $R_5$) is supplied to the transistor $T_{46}$ to reduce the saturated collector-emitter voltage VcEsat of the transistor $T_{43}$ accompanying increase in the collector current flowing through the transistor $T_{44}$, so that the voltage at the output terminal $S_n$ can be reduced to increase the saturated collector-emitter voltage VcEsat of the transistor T$_{43}$. However, the next time the low level signal is applied again to the input terminal A$_n$, the transistors T$_{44}$ and T$_{43}$ are respectively switched off and on in a manner similar to as hereinabove described.

Figure 12A:
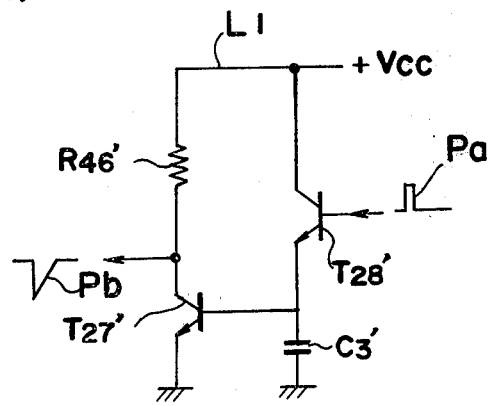
FIGS. 12(a) and 12(b) are circuit diagrams showing modifications of a portion of reset decoder.
Figure 12B:
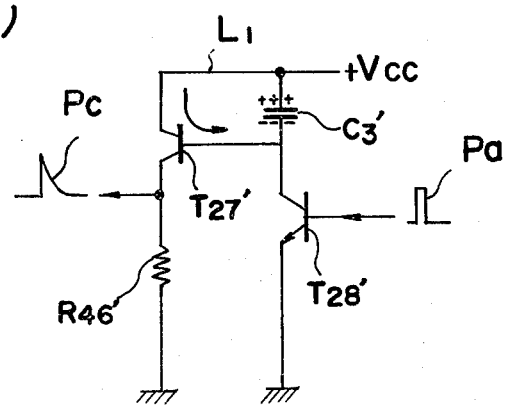

It is to be noted that the reset pulse generator employed in the circuit shown in FIG. 5 may be modified as shown in any one of FIGS. 12(a) and 12(b). The modified form of the reset pulse generator shown in any one of FIGS. 12(a) and 12(b) is advantageous in that a capacitor of relatively low capacitance can be employed in place of the capacitor C$_3$ which in turn provides the capability of manufacturing the reset pulse generator in a compact size in the form of an integrated circuit.

Referring now to FIG. 12(a), the reset pulse generator comprises a first transistor T$_{28}'$ having its emitter connected to the ground through a capacitor C$_3'$ and also to the base of a second transistor T$_{27}'$. In this arrangement, when an input pulse Pa is applied to the base of the first transistor T$_{28}'$, the first transistor T$_{28}'$ is switched on during the duration of the input pulse Pa to allow a voltage across the first transistor T$_{28}'$ to be charged on the capacitor C$_3'$. The voltage charged on the capacitor C$_3'$ is developed at the emitter of the transistor T$_{27}'$ through the base-emitter impedance of the transistor T$_{27}'$. Accordingly, a negative voltage is developed at the collector of the transistor T$_{27}'$. However, the base-emitter impedance of a transistor is generally high, a relatively long period of time is required for the capacitor C$_3'$ to complete discharge of voltage stored therein. Accordingly, a negative going sawtooth voltage Pb is developed across a resistor R$_{46}$, which is inserted between the collector of the transistor T$_{27}'$ and the power line L$_l$, which sawtooth voltage Pb is dradually reaching to voltage approximately equal to the power line L$_1$ in a period of time longer than the duration of the input pulse Pa. Such arrangement described above is employed in the circuit of FIG. 5 particularly when the flip-flop circuits and/or other circuits are so designed to be reset by negative going pulse.

Furthermore, the capacitor C$_3'$ which has been described and shown as connected between the emitter of the transistor T$_{28}'$ and the ground in the arrangement shown in FIG. 12(a) may be inserted between the collector of the transistor T$_{28}'$ and the power line L$_1$ as shown in FIG. 12(b). This arrangement produces a positive going pulse Pc from the collector of the transistor T$_{27}'$. In the arrangement shown in FIG. 12(b), care must be taken that the transistor T$_{27}'$ is PNP type transistor and that hot and cold terminals of the capacitor C$_3'$ must be connected to the power line L$_1$ and the collector of the transistor T$_{28}'$, respectively.

As hereinabove described, the modified form of reset pulse generator shown in any one of FIGS. 12(a) and 12(b) is so designed that the voltage charged on the capacitor C$_3'$ is discharged by the utilization of the base-emitter impedance of the transistor T$_{27}'$, the time required for the capacitor C$_3'$ to complete discharge of the voltage stored therein can be prolonged even if the capacitor C$_3'$ is of a relatively low capacitance. Therefore, the modified reset pulse generator can be assembled into the integrated circuit together with the other circuit components.

Although the present invention has been fully described by way of examples with reference to the accompanying drawings, it is to be noted that various changes and modifications are apparent to those skilled in the art. Such changes and modifications are, unless they depart from the true scope of the present invention, to be understood as included therein.

What is claimed is:

1. In a television receiver set having means for separating and generating a composite sync pulse, which include equalizing pulses, vertical sync pulses and horizontal sync pulses and means for generating horizontal frequency pulses, a line sampling circuit for detecting a particular line defined between the neighboring horizontal sync pulses produced during the vertical blanking interval and carrying a reference signal on said particular line and producing a signal indicative of the presence of said particular line, said line sampling circuit comprising, in combination:
   first filtering means for filtering the vertical sync pulses;
   second filtering means for filtering the horizontal frequency pulses;
   means for counting said filtered vertical sync pulses and said filtered horizontal frequency pulses;
   gate means connected to the first and second filtering means and to the counting means for enabling said first filtering means to filter an even number of vertical sync pulses through the first filtering means and disabling said second filtering means to filter the horizontal frequency pulses therethrough when the first filtering means supplies the even number of vertical sync pulses, said gate means, after the first filtering means has filtered the even number of the vertical sync pulses, disabling said first filtering means to filter the vertical sync pulses and enabling said second filtering means to filter the horizontal frequency pulses, and
   line decoder means connected to the counter means for producing, after said counting means has counted a predetermined number of pulses, a pulsating signal having a pulse duration equal to one line horizontal scanning period.

2. A line sampling circuit as claimed in claim 1, further comprising reset means connected to the counting means and the gate means for producing a reset signal after the counting means has counted a certain number of pulses which is greater than said predetermined number of pulses, said reset signal being applied to the counting means for resetting said counting means and also to the gate means for resetting the first and second filtering means to disable further filtering of the horizontal frequency pulses through the second filtering means and to enable the first filtering means to filter the vertical sync pulses in the next succeeding field of the televised image.

3. A line sampling circuit as claimed in claim 1, wherein said even number is two.

4. A line sampling circuit as claimed in claim 1, wherein said first filtering means comprises a first transistor receiving said composite sync pulses, a capacitor connected to the first transistor, a source of electric power coupled to the capacitor for charging the capacitor during the presence of any one of pulses in said composite sync pulses and for discharging the capacitor during the absence of such any one of pulses in said composite sync pulses, said capacitor charging a voltage which is of the highest value during the presence of each of the vertical sync pulses, and a differential amplifier connected to said capacitor for detecting said highest voltage and producing a pulsating signal indicative of detection of said highest voltage.

5. A line sampling circuit as claimed in claim 4, further comprising a second transistor receiving said horizontal frequency pulses and connected to the capacitor for discharging said capacitor during the presence of said horizontal frequency pulese.

6. A line sampling circuit as claimed in claim 1, wherein said counting means comprises five sets of flip-flop circuits.

7. A line sampling circuit as claimed in claim 6, wherein each of said flip-flop circuit comprises a primary flip-flop constituted by first and second transistors, a steering flip-flop constituted by third and fourth transistors, two driving transistors and two adjusting resistors, said first transistor of the primary flip-flop having a collector-emitter path connected in parallel to one of the adjusting resistors and in series with a collector-emitter path of the third transistor of the steering flip-flop, said second transistor of the primary flip-flop having a collector-emitter path connected in parallel to the other of the adjusting resistor and in series with a collector-emitter path of the fourth transistor of the steering flip-flop, said third transistor of the steering flip-flop having a collector-emitter connected in parallel to a collector-emitter path of one of the driving transistors, and said fourth transistor of the steering flip-flop having a collector-emitter connected in parallel to a collector-emitter path of the other of the driving transistors.

8. A line sampling circuit as claimed in claim 2, wherein said reset means includes a reset pulse generating means comprising a charging transistor, a delay capacitor connected in series with a collector-emitter path of the charging transistor, a pulse generating transistor having a base thereof connected to one side of said delay capacitor and a source of electric power soupled to said charging transistor and to said pulse generating transistor, said delay capacitor charging a voltage upon application of pulse to said charging transistor and discharging the voltage through a base-emitter path of the pulse generating transistor for generating a sawtooth pulse from said pulse generating transistor.

9. A line sampling circuit as claimed in claim 2, wherein said reset means includes a reset pulse generating means comprising a discharging transistor, a delay capacitor connected in series with a collector-emitter path of the discharging transistor, a pulse generating transistor having a base thereof connected to one side of said delay capacitor and a source of electric power coupled to said discharging transistor and to said pulse generating transistor, said delay capacitor discharging a voltage upon application of pulse to said discharging transistor and charging the voltage through a base-emitter path of the pulse generating transistor for generating a sawtooth pulse from said pulse generating transistor.

10. A line sampling circuit as claimed in claim 1, wherein said counting means is constituted by a non-synchronizing counter.

11. A line sampling circuit as claimed in claim 10, wherein said line decoder means comprises a multi-emitter transistor having a plurality of emitters which are connected to the counting means and a controlling transistor receiving the horizontal frequency pulses and connected to the multi-emitter transistor, said controlling transistor actuating the multi-emitter transistor during the presence of the horizontal frequency pulses.

12. A line sampling circuit as claimed in claim 4, wherein said differential amplifier is constituted by a pair of transistors.

* * * * *